United States Patent Office 2,777,879
Patented Jan. 15, 1957

2,777,879
PROCESS FOR PREPARING TRIAMINODIPHENYL ETHERS

Louis Spiegler, Woodbury, N. J., assignor to E. I. du Pont de Nemours and Company, Wilmington, Del., a corporation of Delaware No Drawing. Application January 24, 1956, Serial No. 561,156

5 Claims. (Cl. 260—571)

This invention is directed to a process for producing triaminodiphenyl ethers wherein a dinitrohalobenzene is reacted with an alkali metal nitrophenolate in aqueous dioxane followed by the catalytic hydrogenation of the dioxane solution of the resulting trinitrodiphenyl ether.

Triaminodiphenyl ethers are valuable as trifunctional cross-linking and network-extending agents for resins, plastics, and elastomers, and as intermediates for triisocyanates which are cross-linking and network-extending agents for polymeric materials containing active hydrogen. Copending applications Serial Nos. 530,882 and 530,883 claim these substances as new compositions.

As described in copending application Serial No. 530,882, the triaminodiphenyl ethers prepared in the present invention may be obtained by catalytically hydrogenating the corresponding trinitro compounds. Among the general methods for preparing the trinitrobodies is the condensation of a dinitrohalobenzene having at least one nitro group ortho or para to the halogen atom with an alkali metal salt of a nitrophenol.

These condensations have been made in the absence of and in the presence of solvents. 2,4-dinitrochlorobenzene has been fused with potassium o- (or p-) nitrophenolate at 150–160° C. for 6 hours to yield the 2,4,4'- (or 2,4,2'-) trinitrodiphenyl ether (Ber. 17, 1764 (1880)). Similarly 2,4,3'-trinitrodiphenyl ether may be obtained from sodium m-nitrophenolate (Ger. 281,053; Frdl. 12, 164 (1914-1916)). Neither of these references, however, disclose yields of trinitrobody produced. Fusion of potassium 2-nitro-4-methylphenolate with 2,4-dinitrochlorobenzene at 30° C. for 1 hour gives 2,4,2'-trinitro-4-methyldiphenyl ether in 86% yield (J. Org. Chem. 19, 1421 (1954)).

Any alkali metal salt of an ortho, meta or para nitrophenol may be used in the condensation. For example, the sodium salt of Examples 1 and 2 may be replaced with one of lithium, potassium, cessium or rubidium. In addition, the 2,4- and 2,6-dinitrochlorobenzenes may be replaced with any 2,4- or 2,6-dinitrohalobenzene.

The crude material produced in the fusion process is generally extracted with solvent to dissolve preferentially the salt product or the trinitrobody, and the trinitrobody is recrystallized from a suitable solvent. The crude trinitrobody often contains impurities which are poisons for hydrogenation catalysts and require further purification before the trinitrobody can be hydrogenated to the triamine.

Use of alcohol-acetic acid mixtures or acetic acid as solvents for this reaction is reported in J. A. C. S. 48, 2660 (1926) for the preparation of the 2,4,2'-, 2,4,3'-, 2,4,4'-, 2,4,2'-trinitro-4'-chloro-, and 2,4,2'-trinitro-4'-bromo-diphenyl ethers. Although no specific directions are given for preparing and isolating these trinitro compounds, again an additional operation appears to be necessary to separate the trinitrobody from the salt product and/or from the solvent. The trinitrodiphenyl ether is converted to the corresponding triamino compound in a solvent employed as carrier or diluent.

It is an object of this invention to minimize the number of operations in the overall process for preparing and hydrogenating the trinitrodiphenyl ethers. It is a further object to provide a reaction medium which, upon completion of the condensation reaction, forms two easily separable phases, the one containing the trinitrobody, the other the salt product. It is a further object to employ this phase containing the trinitrobody, without having to first isolate and purify the trinitrobody, in the step of catalytically hydrogenating said trinitrobody to the corresponding triamine.

It is a particular object of this invention to employ aqueous dioxane as the reaction medium for the preparation of the trinitrodiphenyl ethers and dioxane as the solvent for the catalytic hydrogenation of said trinitrobodies to the corresponding triaminodiphenyl ethers.

More specifically, the present invention is directed to the process for preparing a triaminodiphenyl ether by reaction of 2,4- or 2,6-dinitrohalobenzene with an alkali metal salt of a nitrophenol to form a trinitrodiphenyl ether followed by catalytic hydrogenation of the trinitrobody, the improvement being in the preparation of the trinitrobody in aqueous dioxane. The quantities of dioxane and water are such that two distinct liquid layers result when formation of the trinitrobody is substantially complete; the aqueous salt layer is then removed by conventional means and the dioxane layer catalytically hydrogenated, aqueous dioxane being recovered by distillation from the triaminodiphenyl ether formed; the recovered aqueous dioxane is then recycled for use in the preparation of the trinitrodiphenyl ether.

The present invention is based on the discovery that aqueous dioxane is an excellent solvent for the reaction of a 2,4- or 2,6-dinitrohalobenzene with an alkali metal salt of an o-, m- or p-nitrophenol, that the trinitrodiphenyl ethers produced in this reaction show surprisingly high solubilities in dioxane, and, that dioxane is an excellent medium for catalytically hydrogenating the trinitrodiphenyl ethers to triaminodiphenyl ethers; the fact that dioxane has been found to be such an excellent medium is based, primarily, on the factor of high solubility of said triamino ether in dioxane, and, the miscibility of the triamine-dioxane solution with the water formed in the reduction.

When aqueous dioxane is the reaction medium, the trinitro product is readily separated from the water and the water-soluble products as a dioxane solution of substantially pure trinitrodiphenyl ether which is free from poisoners of hydrogenation catalysts. Catalytic hydrogenation of this dioxane solution produces the corresponding triaminodiphenyl ether in excellent yield. The water formed in the conversion of nitro to amino groups is simply removed along with dioxane by distillation from the resulting amine, and the recovered aqueous dioxane may be used directly in the preparation of additional trinitrobody.

It has unexpectedly been found that the use of dioxane and water in certain proportions automatically facilitates separation of the trinitrobody from the water-soluble reaction products. 2,4,4'-trinitrodiphenyl ether, for example, is sufficiently soluble in dioxane at 60 to 95° C. to produce solutions containing up to 80% by weight of the trinitro compound. Furthermore, while dioxane and water are miscible in all proportions, dioxane solutions containing 40 to 80% by weight of trinitro compound are substantially immiscible with aqueous salt solutions, the solubility of dioxane in the water layer and of water in the dioxane layer decreasing with increasing salt concentration. The concentration of trinitrodiphenyl ether in the above range, and of salt in the range 10 to 25% by weight of its aqueous solution, may be easily adjusted so that the two immiscible phases stratify, the dioxane solution on the bottom and the salt solution on top. By varying concentrations of the various components in the system, the densities of the two layers can be made to approach one another so that the two immiscible phases do not stratify. The relative proportions of the various components of these solutions may be adjusted so that the aqueous salt solution is the lower (more dense) layer and the dioxane solution of the trinitrobody the upper (less dense) layer. However, for reasons of economy and for convenience in handling the reaction mixture we prefer that the dioxane solution be the lower layer and that the concentration of the trinitrodiphenyl ether in dioxane be 40 to 75%, preferably 50 to 55%. Since the density of the dioxane solution increases with increasing concentration of trinitrodiphenyl ether and the density of the aqueous solution also increases with increasing salt content, the maximum concentration of salt, which still provides for an upper layer, will be determined by the density of the particular dioxane solution at hand. For example, with 50 to 55% by weight solutions of trinitrodiphenyl ether in dioxane (corresponding to densities of about 1.2 to 1.25 at 70 to 75° C.) the concentration of sodium chloride in water may be as high as 22 to 25% (corresponding to densities of about 1.18 or less at 70 to 75° C.). Since aqueous solutions of the other alkali metal halides are slightly more or less dense than the corresponding sodium chloride solutions, the maximum concentration of any of these salts will vary as the density of the solution varies. To minimize loss of the dioxane to the water solution we prefer that the water layer contain at least about 10% by weight, most preferably at least about 15% by weight of alkali metal halide.

In the preparation of the trinitrobodies, namely, the 2,4,2'-, 2,4,3'-, 2,4,4'-, 2,6,2'-, 2,6,3'-, and 2,6,4'-trinitrodiphenyl ethers, particularly the 2,4,4'-isomer, we prefer for reasons of economy to employ the 2,4- and 2,6-dinitrochlorobenzenes rather than any other 2,4- and 2,6-dintrohalobenzene, and the sodium rather than any other alkali metal salt of an o-, m-, or p-nitrophenol. From approximately stoichiometric quantities of the preferred classes of reactants there will be produced equimolar quantities of a trinitrodiphenyl ether and sodium chloride. According to the method of the present invention the quantities of dioxane and water in the reaction mixture will suffice to produce a 40 to 75%, preferably 50 to 55%, solution of the trinitrodiphenyl ether in dioxane and a less dense aqueous layer containing from 10 to about 25%, preferably 15 to 20%, by weight of the sodium chloride formed when the condensation is substantially complete.

The present invention is illustrated in the following examples wherein quantities are in parts by weight:

EXAMPLE 1

*Preparation of 2,4,4'-trinitrodiphenyl ether*

A solution of 131 parts of sodium hydroxide in 1026 parts of water is added gradually over a period of one hour to a stirred solution consisting of 664 parts of 2,4-dinitrochlorobenzene, 456 parts of p-nitrophenol and 950 parts of dioxane, while the mixture is being heated to its reflux temperature (approx. 93° C.). The reaction mixture is agitated and held at the reflux temperature until the condensation is complete, approximately 6 to 8 hours being required under these conditions. The extent of reaction is readily followed by titrating samples, which are periodically removed from the reaction mixture, with standardized solutions of hydrochloric acid or silver nitrate. The former method measures disappearance of nitrophenolate ion, the latter formation of chloride ion.

The hot reaction mixture settles into two distinct layers. The lower layer while still hot is simply drained from the reactor through a pipe in the bottom of the reactor, leaving the upper layer behind. The upper layer remaining in the reactor consists of 1330 parts of an aqueous solution containing 190 parts of sodium chloride and very small quantities of sodium p-nitrophenolate and 2,4-dinitrophenolate. The recovered lower dioxane layer, totaling 1850 parts, contains 950 parts of 2,4,4'-trinitrodiphenyl ether. This dioxane solution may be stored or sent directly to the hydrogenator (see Example 3), or if desired the trinitrobody may be completely recovered in 95% yield, M. P. 115–116° C., by distilling off the dioxane.

Above, starting with 950 parts of dioxane and 1026 parts of water we obtain a final dioxane solution containing approximately 51% by weight of 2,4,4'-trinitrodiphenyl ether and an aqueous solution corresponding to about 14% by weight of sodium chloride. The quantity of dioxane may vary from about 300 to 1400 parts (to produce approx. 75 to 40% solutions of trinitro compound) and the quantity of water may vary from about 1700 to 570 parts (to produce approx. 10 to 25% solutions of sodium chloride). In practice it will be found that a small quantity of dioxane will be lost to the aqueous layer and hence the concentration of salt in the layer will be somewhat less than the theoretical value. Also, depending on the facilities available for preventing loss of the volatile dioxane, some dioxane may be lost by evaporation from the solution of trinitrobody at temperatures of 70–75° C. and above. In this event, dioxane may be re-added to the system as needed to keep the trinitrobody in solution or at the desired concentration.

Although the relative proportions of dioxane and water are not critical for the progress of the condensation, they are critical if one is to obtain two distinct, easily separated, liquid layers when this reaction is complete. It is obvious that the relative quantities of dioxane, water, trinitrobody and salt needed to achieve the desired separation of reaction products in the form of two liquid layers may easily be adjusted by adding any or all of these substances to the final reaction mixture.

In the preparation of trinitrodiphenyl ethers the reaction temperature may vary from about 70° C. to about 150° C. However, for optimum results with regard to reaction rate, yield and purity of product, it is best to operate at 90 to 115° C. When temperatures greater than the atmospheric reflux temperature of Example 1 are employed the pressure on the system will necessarily have to be increased because of the volatility of dioxane and water. Under these conditions a sealed reactor, e. g., an autoclave, should be employed. An increase in the temperature of reaction leads to an increase in the rate of formation of the trinitrodiphenyl ether. Thus at 110–115° C., in a sealed reactor the reaction time is lessened considerably, as illustrated below, Example 2.

An increase in reaction rate is also realized on using excess of the alkali metal nitrophenolate; however, for reasons of economy it is preferred to employ approximately stoichiometric quantities of the reactants, with the alkali metal nitrophenolate in slight molar excess, i. e., 0 to 5% most preferably 3%, excess.

EXAMPLE 2

850 parts of technical dinitrochlorobenzene (96% 2,4- and 4% 2,6-), 712 parts of sodium p-nitrophenolate (corresponding to about a 5% molar excess), 1216 parts of dioxane and 1356 parts of water are mixed in an autoclave equipped with an agitator. The agitated mixture is heated to 110° C. in 1 to 1.5 hours, with the vent on the autoclave being left open until the temperature reaches about 70° C. The sealed reactor is held at 110° C. for 4 hours; at this temperature the pressure on the system is about 20 p. s. i. g. After being cooled to 80° C. the contents of the autoclave are filtered, preferably under pressures of up to 40 pounds, to remove a small quantity of insoluble material. The filtrate consists of 1586 parts of an upper aqueous layer and of 2292 parts of a lower dioxane layer having a density of about 1.21 to 1.22 at 70° C. and containing approx. 53% by weight of trinitrodiphenyl ether. The yield of trinitrodiphenyl ether, obtained as its dioxane solution, is 95% of theory.

Assuming a theoretical yield of trinitrobody and no loss of dioxane, we would obtain a 48.6% solution of this product. However, in this example, a considerable quantity of dioxane was lost by evaporation during filtration of the hot reaction mixture. If desired, of course, the dioxane may be recovered in a condenser and returned to the system. A smaller quantity of dioxane was also lost to the aqueous layer. The water layer obtained corresponds to a 15.5% solution of sodium chloride, whereas the original quantity of water was sufficient to produce a 16.8% solution.

It has been found that occasionally the trinitrodiphenyl ethers will adsorb hydrogen rather slowly in the hydrogenation step. This sluggish behavior is traceable to the presence of impurities which poison hydrogenation catalysts. Such impurities either are originally present in the reactants in accordance with their previous histories or may be produced in minute quantities via secondary reactions. The latter is more likely to be the case when high temperatures and pressures are employed in the condensation step. Therefore, it is sometimes desirable to treat the dioxane solution of trinitrodiphenyl ether with small quantities of an adsorbent and a filter aid such as celite, and to filter this dioxane solution before sending it to the hydrogenator. Suitable adsorbents for the impurities are Darco S-51 activated charcoal and Shawinigan carbon black. These, preferably Shawinigan carbon black, may be added along with the reactants, e. g., 6 parts of adsorbent in the above example, or may be added to the reaction mixture at the beginning, during or at the end of the condensation reaction without sacrificing yield or quality of the triaminodiphenyl ether eventually produced.

The quantities of adsorbent that may be needed will depended upon the purity and source of the reactants and upon the severity of the reaction conditions. Normally as low as 0.05 to 1% of the weight of the reaction mass will suffice, but somewhat larger quantities may be used as required.

Considering the rather simple chemistry of the condensation reaction illustrated above it is obvious that the method of our invention is essentially independent of the preparative reaction itself. The point of the invention relevant to this reaction is the separation of the two principal components of the final reaction mixture, the water-insoluble trinitrobody and the water-soluble salts. Thus the above examples show how 2,4,4'-trinitrodiphenyl ether may be directly removed from the reaction mixture as the substantially pure compound dissolved in dioxane. In Example 3 below it is shown how this dioxane solution may be directly hydrogenated to 2,4,4'-triaminodiphenyl ether.

EXAMPLE 3

The dioxane layer which is obtained in Example 1 may be directly hydrogenated over the usual catalysts in conventional hydrogenation equipment, under conditions of temperature and pressure generally employed for converting nitro groups to amino groups. The following method is particularly suited to large scale operations.

A jacketed steel autoclave equipped with an agitator is charged to about 15% of its capacity with 400 parts of dioxane and 0.1 part of a catalyst consisting of 4.5% palladium, 0.5% platinum, and 5% iron as ferric hydroxide, supported on Shawinigan carbon black. The autoclave is then pressured with hydrogen to 100 p. s. i. g. $H_2$, the agitator speed is adjusted to 900 R. P. M., and the temperature is raised to 75-80° C. The dioxane-trinitrodiphenyl ether solution from Example 1, held at a temperature of 60-80° C. is then fed under pressure to the hydrogenator in portions of approximately 35 parts each. As the nitrobody is reduced, the hydrogen pressure drops and heat is evolved. The temperature is maintained at 90-100° C. by circulating coolant (e. g., 70-85° water) through the autoclave's jacket. After each portion of trinitro compound has been reduced, the system is repressured with hydrogen.

When the reactor has become filled to 70-75% of its capacity by the addition of increments of the dioxane solution as described, the feed of nitrobody and of hydrogen is stopped. The contents of the autoclave are discharged and filtered to recover the catalyst. The filtrate consists of dioxane, 2,4,4'-triaminodiphenyl ether and water produced in the hydrogenation of nitro to amino groups. Distillation of this filtrate at 50° C. and below under reduced pressure completely removes water and dioxane, leaving 2,4,4'-triaminodiphenyl ether, M. P. 102–104° C., in 96% yield based on the quantity of trinitro compound fed to the reactor.

If desired, the triamine may be further purified by distillation under reduced pressure, B. P. 215–218° C./0.2 mm., M. P. 111–113° C., or, it may be recrystallized from benzene, toluene, ortho-dichlorobenzene and the like, M. P. 111–113° C.

The recovered aqueous dioxane (25–30% by weight of water), without further treatment, is then recycled to the reactor for preparing additional trinitrodiphenyl ether as described in Example 1. More water is added at this stage to provide the proportions of dioxane and water that are needed to obtain two distinct, easily separable layers when formation of the trinitrobody is substantially complete.

If desired, a portion of the triaminodiphenyl ether-dioxane filtrate may be returned to the hydrogenator as the "heel" for the reduction of a second charge of trinitrobody in dioxane.

In the above method of hydrogenation, pressures will preferably range from 100 p. s. i. g. $H_2$ at an agitator speed of 900 R. P. M. to 500 p. s. i. g. $H_2$ at an agitator speed of 225 R. P. M. Under these economically practical conditions, rate of reduction is rapid, and yield and purity of the triaminodiphenyl ether are high. Slower rates prevail at lower temperatures and/or pressures, while no economic advantage is gained on resorting to higher temperatures and/or pressures to accelerate rate of reduction.

Other typical catalysts for hydrogenating nitro to amino groups, such as palladium or platinum supported on charcoal or nickel on kieselguhr, may be employed with good results. Also, but less preferably, the solution of trinitrodiphenyl ether in dioxane and the catalyst may be added all at once to the autoclave and hydrogenated in the conventional batch process. Here again, temperatures of 50 to 100° C. at pressures of 100 to 500 p. s. i. g. $H_2$ are suitable.

For example, a dioxane solution of mixed trinitrodiphenyl ethers prepared according to the method of Example 1 from a 90:10 mixture of 2,4- and 2,6-dinitrochlorobenzene and sodium p-nitrophenolate, may be hydrogenated over a platinum and palladium on carbon catalyst at 100 p. s. i. g. $H_2$ to give the mixed triaminodiphenyl ethers in 96% yield.

Using aqueous dioxane as the reaction medium, separation of the trinitrodiphenyl ether from the water-soluble products is easily and simply accomplished. There is no need to isolate and purify the trinitrodiphenyl ether from its solution in dioxane; the dioxane solution may be directly hydrogenated in the conventional manner to give triaminodiphenyl ether in high overall yield. The dioxane, recovered from the hydrogenation reaction as aqueous dioxane, may be recycled directly as the reaction medium for the preparation of trinitrobody.

I claim:

1. In the process for preparing a triaminodiphenyl ether by reacting a dinitrohalobenzene taken from the group consisting of 2,4-dinitrohalobenzene and 2,6-dinitrohalobenzene with an alkali metal salt of a nitrophenol to form a trinitrodiphenyl ether followed by catalytic hydrogenation of said trinitrodiphenyl ether, the improvement wherein said trinitrodiphenyl ether is prepared in aqueous dioxane resulting in an aqueous salt layer and a dioxane layer, said layers being separated, said dioxane layer containing trinitrodiphenyl ether then being catalytically hydrogenated to yield the corresponding triaminodiphenyl ether and aqueous dioxane, said aqueous dioxane then being recovered by distillation from said triaminodiphenyl ether and recycled for use in the preparation of said trinitrodiphenyl ether.

2. The process of claim 1 wherein the trinitrodiphenyl ether is prepared in aqueous dioxane, the quantity of dioxane being controlled to produce a 40–75% solution of said trinitro compound and the quantity of water being controlled to produce an aqueous salt layer containing at least 10% of the alkali metal halide, said aqueous salt layer being less dense than said solution containing said trinitro compound.

3. The process of claim 1 wherein the dinitrohalobenzene is taken from the group consisting of 2,4-dinitrochlorobenzene and 2,6-dinitrochlorobenzene.

4. The process of claim 1 wherein the dinitrohalobenzene is a mixture of 2,4-dinitrochlorobenzene and 2,6-dinitrochlorobenzene.

5. The process of claim 2 wherein a 50–55% solution of trinitrodiphenyl ether in dioxane is utilized.

References Cited in the file of this patent
UNITED STATES PATENTS

| | | |
|---|---|---|
| 2,175,003 | Sly | Oct. 3, 1939 |
| 2,440,530 | Yates | Apr. 27, 1948 |